Patented Sept. 7, 1937

2,092,191

UNITED STATES PATENT OFFICE 2,092,191

SOLDERING FLUX

Charles A. Thomas, Dayton, Ohio, assignor to Standard Cap and Seal Corporation, New York, N. Y., a corporation of Virginia No Drawing. Application May 21, 1932, Serial No. 612,870. Renewed January 28, 1937

1 Claim. (Cl. 148—25)

This invention relates to a process of soldering and a composition adapted to be used as a soldering flux.

One of the principal objects of this invention is to provide a process whereby metallic surfaces, such as tinned steel wire may be readily cemented together by the application of heat, the effectiveness of such soldering process being unaffected by exposure of the metallic surfaces to air for relatively long periods of time.

Another object is to provide a composition which acts as a flux in the cementing or soldering of such metallic surfaces, such fluxing composition being unaffected by exposure to air.

Other objects and advantages of the invention will be apparent from the following description and appended claim.

In cementing together metallic surfaces such as steel wire, a soldering process is generally utilized. This may be done by first passing steel wire through a bath of molten solder, and later cementing together the resulting tinned surfaces by the application of heat. The solder thus acts as a seal to fasten together the metallic surfaces in the desired position, for example, overlapping ends of a wire may be mechanically held in position during the application of heat and until sufficiently cooled and hardened so that the solder holds together the ends in the desired position. This type of seal is especially applicable to wire closures for hood-type bottle caps, such as used on milk bottles and the like. When the tinned coating or surface is fresh, cohesion between such surfaces is readily obtained by the simple application of the required degree of heat. However, if allowed to stand exposed to air until oxidation has taken place it is found that use of a fluxing agent is necessary to obtain cohesion between the surfaces. It is found that oils, such as lard oil, which have heretofore been suggested for this purpose, are readily oxidized on standing exposed to the air, and become rancid and so changed in character and properties that they no longer act as a flux in the soldering operation. Consequently, wires coated with such materials and then allowed to stand exposed to air until oxidation takes place, cannot be effectively soldered by heat alone without further treatment. It is desirable that the fluxing material used be capable of application by a simple treatment in such manner tha no excess is present, and that it be of such character as not to be affected by exposure to air.

I have now discovered that when a metallic surface, such as steel wire, is coated with a suitable soldering material, and is then coated with a solution of a soluble fluxing agent in a stable oil which is non-oxidizable by exposure to air, such as paraffin oil, such wire may be exposed to air without danger of oxidization or deterioration of the coating film. The non-oxidizing oil is thus used as a solvent and carrier for the fluxing agent. A tin coating of this fluxing composition acts as a fluxing agent when heat is applied to the tinned surfaces, and satisfactory cohesion between the tinned surfaces is readily obtained regardless of prolonged exposure to air. It is also found that further addition of fluxing agent or other treatment during or preceding the soldering operation is unnecessary.

As an example of the carrying out of this invention the freshly tinned wire is passed through a bath comprising paraffin oil containing in solution approximately 5 per cent by weight of a soluble fluxing agent, such as pine rosin, carnauba wax, halowax or halowax oil (chlorinated naphthalenes). The composition forms on the wire a thin coating which is not affected by exposure to air. When it is desired to cement together any surfaces of the coated wire, as for example, overlapping ends, the parts to be cemented are clamped or held in the desired position, and heat is then applied in any desired manner as by passing an electric current through the wire. The tin or solder coating on the wire in conjunction with the fluxing agent coated thereon readily fluxes on the application of heat, and on being allowed to cool it hardens in position. A tight seal between the ends of the wire is thus obtained.

Any stable oil which is not affected by exposure to air and which is capable of forming a non-volatile film on the surface to be soldered, may be used as a solvent or carrier, according to the invention, such for example as asphalt base oils such as paraffin oil, light lubricating oils and the like. Any fluxing agent which is readily soluble in the solvent oil used and which is not oxidized, decomposed or rancidified by exposure to air, may be satisfactorily used to form a fluxing composition according to this invention. For example, halowax, halowax oil, pine rosin and carnauba wax have been found to give good results.

The proportions of fluxing agent used may vary widely but in general it has been found that a proportion of approximately 5 per cent by weight of fluxing agent with 95 per cent by weight of non-oxidizing oil, is sufficient to give a satisfactory fluxing action. In some cases considerably less may be used, for example, a composition containing approximately 2½ per cent by weight of carnauba wax and 97½ per cent of paraffin oil has been found satisfactory.

While the methods herein described and the products so produced constitute preferred embodiments of this invention, it is to be understood that the invention is not limited to these precise methods or precise products, and that changes may be made therein without departing from the scope of the invention which is described in the appended claim.

What is claimed is:

A liquid soldering flux consisting of a non-corrosive rosin fluxing agent in solution in a stable, non-oxidizing lubricating oil, the solution being in the proportion of approximately 5 per cent by weight of fluxing agent and approximately 95 per cent by weight of oil capable of forming on a solder coated metallic wire, a combined fluxing and protective film for the purpose set forth.

CHARLES A. THOMAS.